United States Patent

McWade

[15] 3,638,162

[45] Jan. 25, 1972

[54] PROGRAMABLE ELECTRIC CIRCUIT CARD

[72] Inventor: John E. McWade, Broomall, Pa.

[73] Assignee: Gulf & Western Industrial Products Company, Grand Rapids, Mich.

[22] Filed: May 4, 1970

[21] Appl. No.: 34,175

[52] U.S. Cl. ..........................338/320, 317/101 CE, 323/80, 338/195, 338/211, 338/254, 339/17 F

[51] Int. Cl. ..........................H01c 1/16

[58] Field of Search ..................339/17 R, 17 F, 17 L, 17 LM, 339/17 M, 18, 18 C; 338/295, 254, 320, 314, 211, 195; 174/112, 68.5; 317/101 CE; 29/592; 323/80

[56] References Cited

UNITED STATES PATENTS

| | | | |
|---|---|---|---|
| 1,997,157 | 4/1935 | Tauschek | 339/17 R |
| 2,758,256 | 8/1956 | Eisler | 338/314 |
| 2,870,400 | 1/1959 | Hickok | 339/18 C |
| 2,883,447 | 4/1959 | Dahl | 317/101 CE X |
| 3,296,360 | 1/1967 | Faler | 174/112 X |
| 3,398,232 | 8/1968 | Hoffman | 317/101 CE X |
| 3,493,671 | 2/1970 | Horowitz | 317/101 CE X |

*Primary Examiner*—E. A. Goldberg
*Attorney*—Meyer, Tilberry and Body

[57] ABSTRACT

A flexible selective programable electrical circuit card including a flexible base onto which electrical film components and film connectors are applied. An indicia which allows the card to be punched in a manner to program the electrical components of the card.

7 Claims, 10 Drawing Figures

INVENTOR.
JOHN E. McWADE

BY
*Meyer, Tilberry & Body*

ATTORNEYS

INVENTOR.
JOHN E. McWADE

BY

*Meyer, Tilberry & Body*

ATTORNEYS

PATENTED JAN 25 1972 3,638,162

INVENTOR.
JOHN E. McWADE
BY
Meyer, Tilberry & Body
ATTORNEYS

INVENTOR.
JOHN E. McWADE
BY
Meyer, Tilberry & Body
ATTORNEYS

PROGRAMABLE ELECTRIC CIRCUIT CARD

The present invention relates to the art of electrical components and primarily a flexible selective programable electrical circuit card and method of making this programable card.

The invention will be described with particular reference to a voltage divider, or potentiometer, constructed on a flexible card that can be programed by punching; however, it is appreciated that the invention has much broader applications and may be used to provide a flexible card having various programable electrical component films coated thereon. A "component film" indicates a film, other than electrically conductive paths, which has a usable electrical characteristic, such as known resistance, that can be used as an electrical component in an electrical circuit.

In process control circuits and similar circuits, it is often necessary to provide a voltage divider having a selected ratio between input and output voltages. Various structures have been suggested for this particular operation; however, many of these structures had to be purchased in a preprogramed condition. For this reason, there has been considerable effort devoted to developing a voltage divider, or potentiometer, which can be programed by a person installing a process control circuit or similar circuit. The programable potentiometer or voltage divider most pertinent to the present invention includes a card which is adopted to be placed over a series of switching devices in an external resistance network. By punching holes in this card and placing over a switch network, certain switches are actuated to incorporate selected resistance elements into a network. This arrangement required an extensive and expensive external switching and resistance circuit to accomplish the desired program results. Also, the card had to be used with known external circuits, correlated with the card, to determine the extent that certain programing of the card resulted in a preselected input-output ratio of the attendant network. The associated network must be known before the hole pattern on the card indicates any particular program.

The present invention overcomes all of these disadvantages by providing a flexible card having layers of resistance material thereon and a plurality of redundant electrically conductive paths. By punching out certain of the redundant paths a preselected, programed ratio for the voltage divider is imparted to the card itself. No external resistance network circuit is required. By providing indicia corresponding to the punched holes on the card, a person viewing the card can easily discern the ratio programed into the card. The ratio is not dependent upon external circuitry.

In accordance with the present invention, there is provided a flexible, selected programable electrical circuit card comprising a flexible base card, an electrical component film on one surface of the base card, a plurality of redundant electrical conductive, film paths on one surface of the base card and electrically connected to the component film, indicia on the circuit card adjacent portions of the various redundant paths to facilitate selective punching through the circuit card and the paths to program the use of the electrical component, and terminal means adjacent one edge of the circuit card and connected with the film paths whereby the circuit card can be electrically connected to an external electrical circuit after programing thereof.

In accordance with another aspect of the present invention, there is provided a method of making a flexible electrical circuit card to be programed by punching holes through the card, this method comprises the steps of: providing a flexible base card; depositing an electrical component film on one surface of the base card; and depositing a plurality of conductive paths on the surface of the card with at least several of these paths each representing a different use of the component film.

The term "redundant" as used in this application indicates a plurality of conductive paths which are, in essence, parallel electrical connections associated with the electrical components, but including a different portion of the component, so that severing of one or more of the redundant paths changes or modifies the amount of the electrical component being placed into the circuit between the output terminals of the flexible card.

The primary object of the present invention is to provide a flexible, selected programable electrical circuit card which includes electrical component film and electrically conductive paths, which card is capable of being punched so that the paths can be severed to provide preselected utilization of the electrical component film at the output terminals of the card.

Another object of the present invention is to provide a flexible, selectively programable electrical circuit card, which can be punched to program the card so that a minimum of external circuit networks are required.

Another object of the present invention is to provide a voltage divider on a punched card whereby punching of the card sets the ratio of the voltage divider independently of external circuits.

These and other objects and advantages will become apparent from the following description taken together with the accompanying drawings in which.

Figure 1:
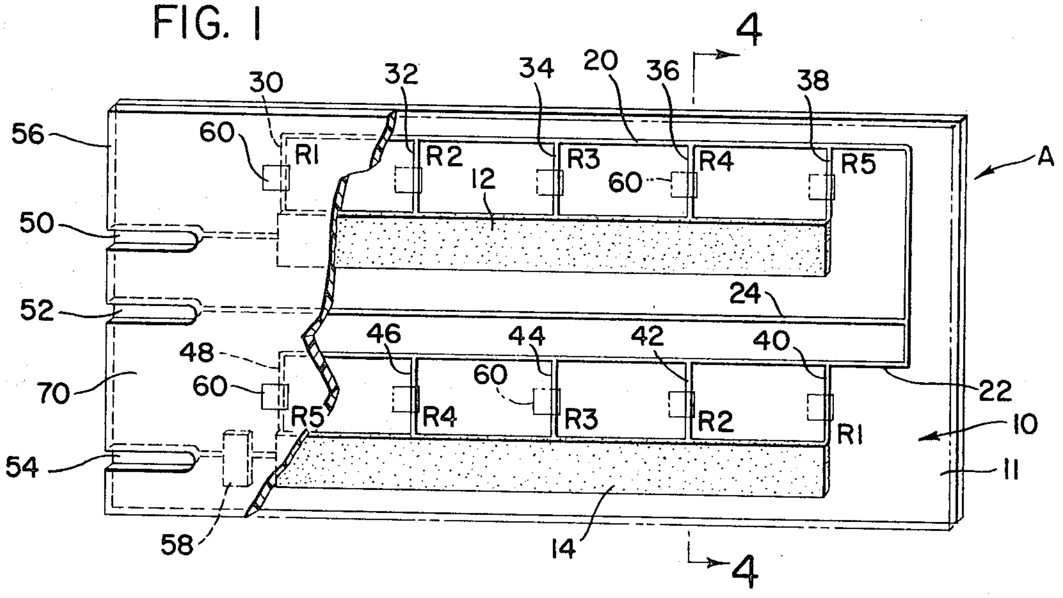
FIG. 1 is a schematic view illustrating an embodiment of the present invention.
Figure 4:
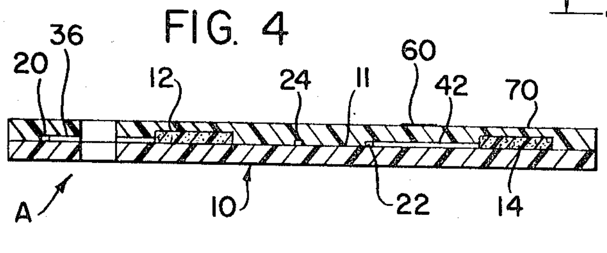
FIG. 4 is an enlarged cross-sectional view taken generally along line 4—4 of FIG. 1.
Figure 5:
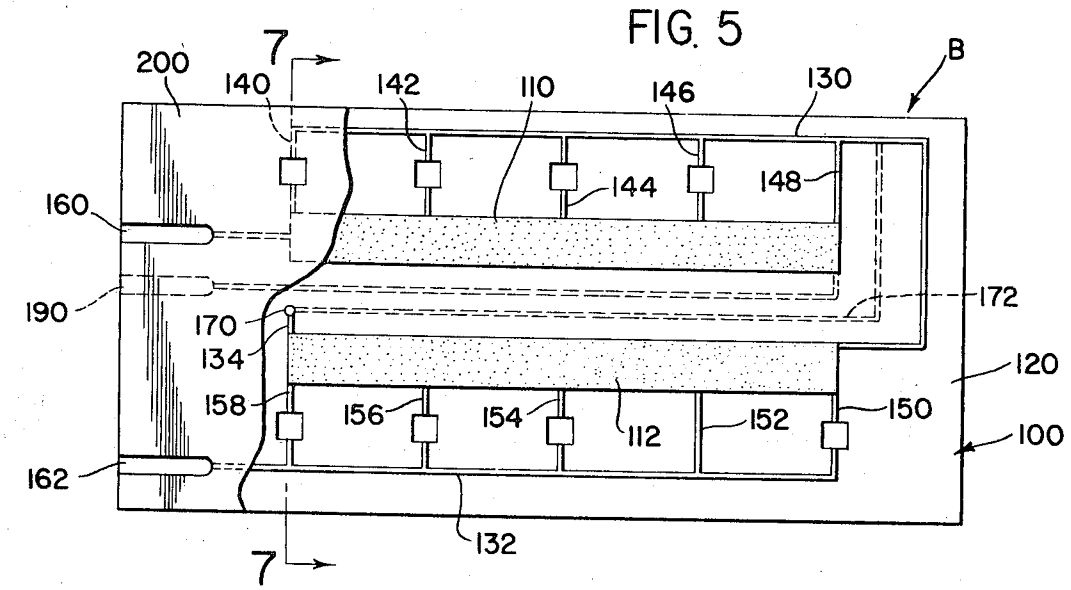
FIG. 5 is a schematic top view of a further embodiment of the present invention.
Figure 6:
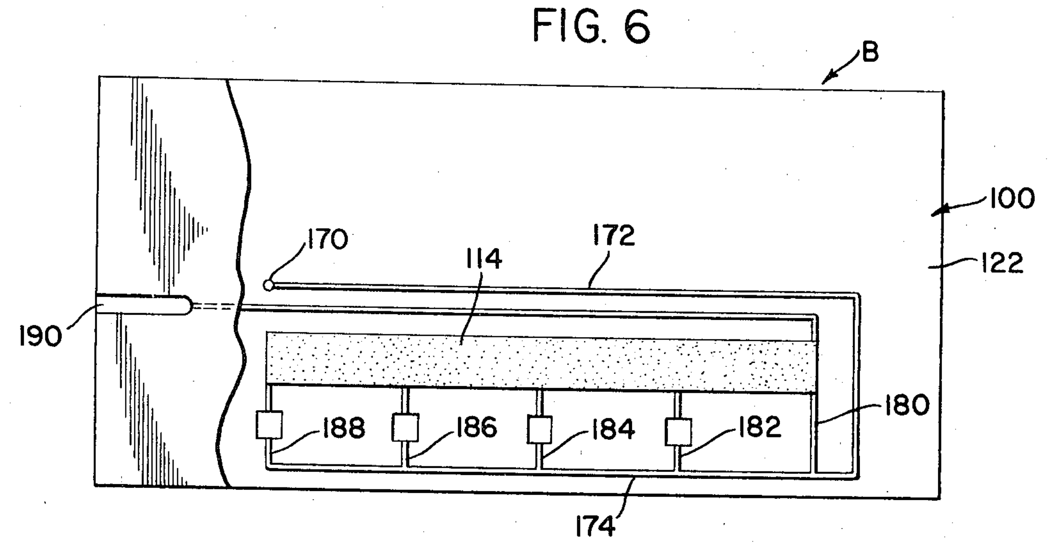
FIG. 6 is a bottom view of the embodiment illustrated in FIG. 5.
Figure 7:
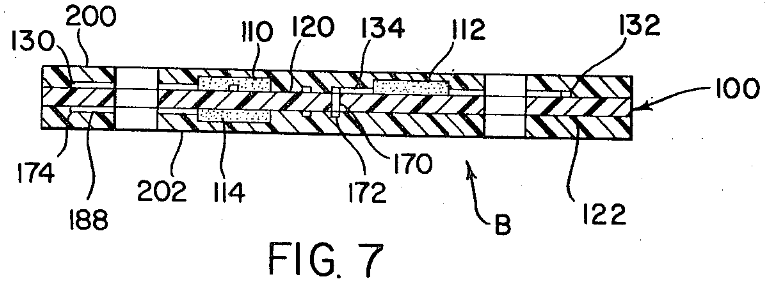
FIG. 7 is an enlarged cross-sectional view taken generally along line 7—7 of FIG. 5.

Referring now to the drawings, wherein the showings are for the purpose of illustrating preferred embodiments of the invention only and not for the purpose of limiting same, FIGS. 1 and 4 illustrate a flexible, selectively programable electrical circuit card A including a flexible base card 10 formed from a suitable flexible plastic material, such as Mylar or flexible polyvinylchloride. This card includes a surface 11 onto which resistance strips 12, 14, are deposited. These strips may be of various compositions, such as plastic having carbon particles embedded therein or other well-known resistance film material which can be screened, painted, photodeposited, or vacuum vaporized onto the surface 11 in a preselected pattern. Although the resistance material is contemplated, it is also possible to use other electrical components such as two films separated by a capacitor material to form a capacitor on base 10. It is conceivable that a capacitor could be provided by coating a film on both sides of the base 10 with the base forming the dividing material. Various other electrical components could be used in practicing the present invention. A plurality of conductive paths are formed from conductive material, such as copper, gold, silver, etc., deposited onto the surface 11 in the pattern shown in FIG. 1. This particular arrangement of conductive paths includes common paths 20, 22, 24, redundant paths 30, 32, 34, 36, 38 on resistance film 12 and redundant paths 40, 42, 44, 46, 48 on resistance film 14. Terminals 50, 52, 54 are provided adjacent edge 56 of card A for connecting the card, and its circuit, to an external network.

Each of the redundant paths has in indicia marking R1–R5 and indicia 60 to indicate the location where that card should be punched to accomplish various programs for the electrical resistance films 12, 14. In this manner, the ratio between leads 50, 54, and 52, 54 is changed. A protective coating of plastic material or, preferably, a plastic film 70 is placed over the surface 11 to protect the films thereon.

Figure 2:
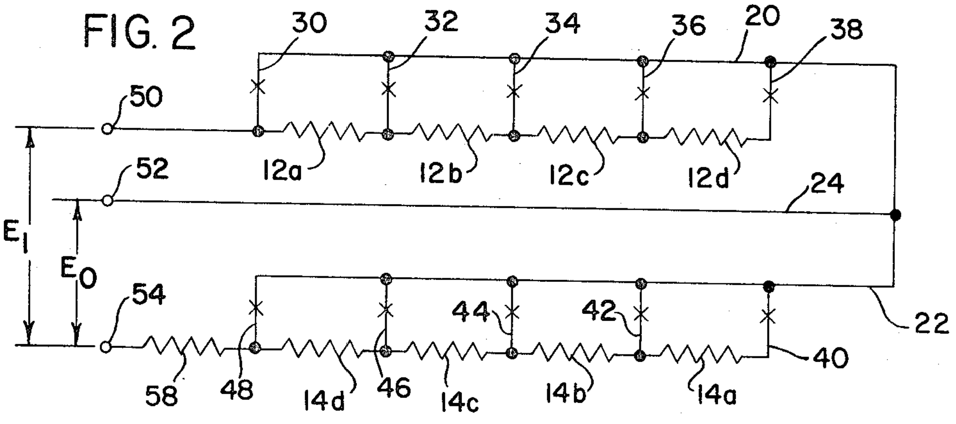
FIG. 2 is a schematic wiring diagram illustrating the electrical circuit of the embodiment shown in FIG. 1.
Figure 3:
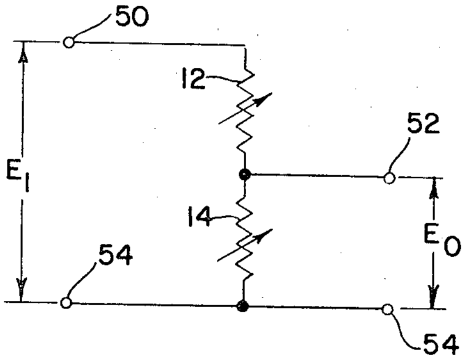
FIG. 3 is an equivalent circuit diagram of the circuit shown in FIG. 2.

The structural features of the embodiment shown in FIGS. 1 and 4 will become obvious from a description of the manner by which the flexible card is programed. Referring to FIG. 2, and electrical circuit is illustrated wherein the films 12 and 14 are divided by separate and distinct resistance elements **12*a*–12 and 14*a*–14*b*, respectively. This is a schematic representation of the structure shown in FIG. 1. The X-markings on FIG. 2 indicate that the redundant paths may be severed by punching the holes through the indicia 60 as shown in FIG. 1. Now assume that it is desired to program the card A so that there is a preselected ratio between the input voltage $E_1$ and output voltage $E_o$. By punching out the card at redundant paths 30, 32, 34, 36 and redundant paths 40, 42, 44, 46, the ratio is primarily the ratio of the complete resistance of film 12 and the resistance of external resistor film 58. Thus, $E_o$ is relatively small. To increase $E_o$, different redundant paths are punched to provide a larger portion of the resistance in film 14 across the terminals 52, 54. This concept is illustrated in the equivalent circuit shown in FIG. 3. The films 12, 14 are adjustable, in a programed manner, by separating various redundant paths to the films 12, 14**. This adjusts the ratio of output voltage to input voltage.

Referring now to FIGS. 5–8, a further embodiment of the present invention is illustrated. In this embodiment, flexible, selectively programable electrical circuit card B includes a flexible base card 100 having resistance strips 110, 112, 114 with strips 110, 112 being on surface 120 and strip 114 being on surface 122. In this embodiment, both surfaces of the base card are used to provide a voltage divider. Referring now to surface 120, conductive paths 130, 132 are used to connect redundant conductive paths 140, 142, 144, 146, 148 and redundant paths 150, 152, 154, 156, 158. Surface 120 includes connecting terminals 160, 162. Referring now to surface 122, the crossover means 170 extending between the surfaces connects common conductive path 134 with common conductive path 172. A second common conductive path 174 is also provided on surface 122. Redundant paths 180, 182, 184, 186, 188 are incorporated on surface 122 to provide selective connections with the film 114. A terminal 190 is used in conjunction with terminals 160, 162 to provide the input and output for card B. Card B is programed by severing all redundant paths except paths 148, 152, and 180. It will be noted that the resistance films 110, 114 and their associated redundant conductive paths are directly aligned so that punching of one redundant path for one of these films punches the corresponding redundant path for the other film. This allows correlation of the two films 110, 114 so that they may be programed simultaneously. Card B is programmed as indicated. This programing is schematically represented in the wiring diagram of FIG. 8. It is noted that various ratios can be accomplished by selectively changing the redundant path combinations of the card B.

Figure 9:
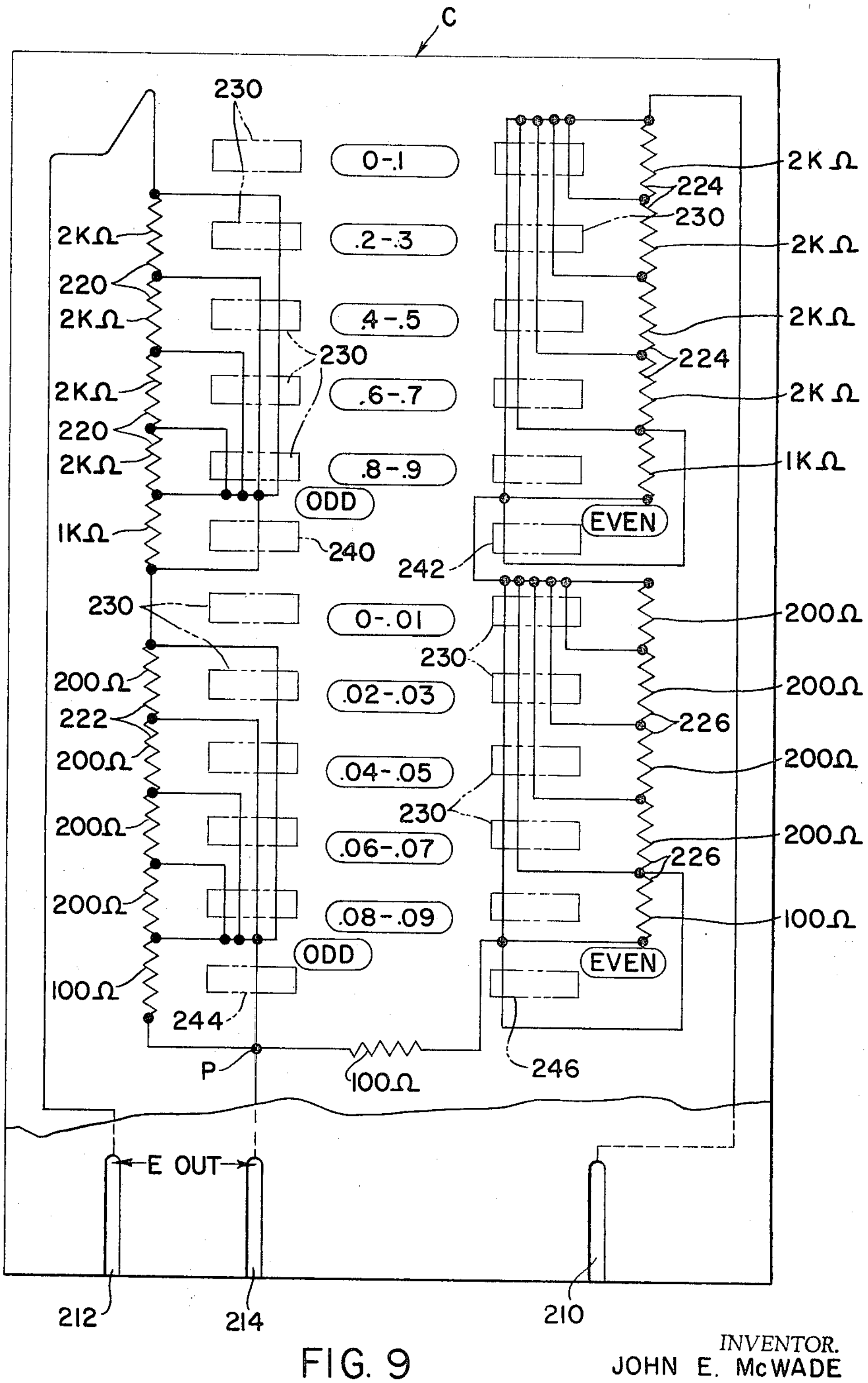
FIG. 9 is a schematic view illustrating a preferred embodiment of the present invention; and, FIG. 10 is a pictorial view illustrating, somewhat schematically, a reader for use of the present invention.

Referring now to FIG. 9, a preferred embodiment of the present invention is illustrated. To simplify the description of flexible card C, it includes terminals 210, 212, 214. The input is across terminals 210, 212 and the output is across terminals 212 and 214. Resistance elements, schematically represented as resistors 220, 222, 224, 226 are coated onto one surface of the card. Several redundant paths are then provided on the card in the illustrated pattern. Detailed description of the various conductive film paths making these redundant paths is not necessary. The circled portions on card C, as shown in FIG. 9, are indicia contained on the front of the card. The several blocks 230 are also printed on the card and indicate the sections which should be punched in accordance with the operation of the card, which will be described later. This particular embodiment of the invention is a six-bit base complement punch format including two decades which has the resolution capabilities of 1.0 percent. The first decade is at the top and second decade is at the bottom. Further decades could be incorporated by using the same general format. The value of the various resistance segments are also included in this figure; however, they may or may not be printed as indicia upon the card itself. A complete understanding of the illustrated structure will be obvious by a description of certain examples.

In operation, the desired ratio between output voltage and input voltage can be programed into the card C as follows. Assume that the ratio of output voltage to input voltage is to be 0.25. The blocks 230 on either side of the indicia indicating the ratio range of 0.2–0.3 are removed by a punching process. Since the ratio of this first decade is even, the EVEN indicia 242 of the first decade is punched. This programs the first decade to a ratio of 0.2. Referring now to the second decade, the two blocks 230 adjacent the indicia indicating a ratio of 0.04–0.05 are removed by punching. Since the ratio wanted is 0.05, the block ODD 244 is punched. By following electrical paths through card C, it will be found that the resistance to the left of point P is 2.5 K and resistance to the right of point P is 7.5 K. This provides the ratio of 2.5 between the input and output voltages with a total resistance of 10 K. Other combinations can be provided to obtain the various ratios between 0 and 0.99 by following the same process.

Figures 8, 10:
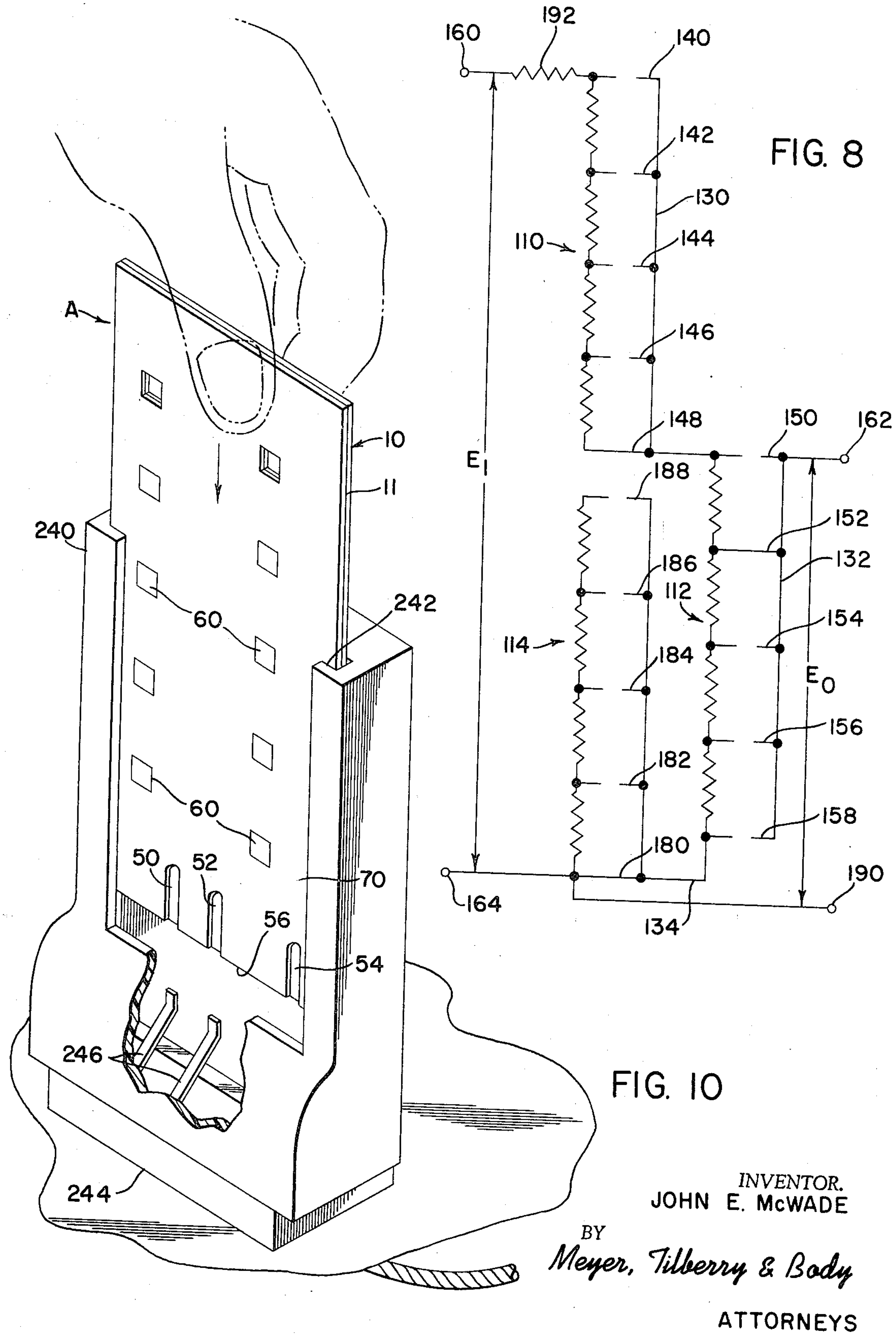
FIG. 8 is a schematic wiring diagram showing the electrical circuit employed in the embodiment of FIG. 5.

Referring now to FIG. 10, there is illustrated a reader 240 having a slot 242 into which a programed card is placed with the terminals extending downwardly toward the base 244. Appropriate contacts 246 are used to engage the respective terminals of the flexible programed card to incorporate the voltage divider into appropriate external circuits.

With the indicia on the card, a mere inspection of the card itself indicates the ratio programed into the card. The person in the field can use appropriate punching elements to obtain any desired voltage ratio by punching the appropriate sections indicated by the indicia. It is appreciated that alternate networks using straight decimal, binary or binary coded decimal can be incorporated into the flexible programable card and programed according to appropriate arrangements.

Having thus described my invention, I claim:

1. A flexible, selectively programable electric circuit card comprising a flexible base card, a complete electrical circuit defined by (a) an electrical component film on one surface of said base card, and (b) a plurality of redundant electrically conductive film paths on one surface of the base card and electrically connected to said component film, indicia on said circuit card adjacent portions of the various redundant paths to facilitate selective punching through said circuit card to electrically sever said paths to program the use of said electrical component in said electrical circuit, terminal means adjacent at least one edge of said circuit card and electrically connected with the electrical circuit defined by said film paths and component film whereby said circuit card can be electrically connected to an external electrical circuit, and a flexible protective covering over said component film and said plurality of redundant electrically conductive film paths.

2. A flexible, selectively programable electrical circuit card for voltage dividing which comprises:

a flexible insulation base, at least two separate electrical component films on one surface of said base, at least two separate groups of a plurality of redundant electrically conductive, film paths on one surface of said base, a separate group associated with each component film, an electrically conductive film path electrically connecting the redundant paths together;

three terminal means adjacent the edges of the base, the first terminal connected to one component film, the second terminal connected to the other component film, and the third terminal connected to the last said electrically conductive film path electrically connecting the redundant paths together, indicia on said circuit card adjacent portions of each of the redundant paths to facilitate selective punching through said circuit card to electrically sever said paths to program the use of said electrical component films in a voltage-dividing action with reference to voltage input on two of the three terminal means and a voltage output including one of said two terminal means and the other terminal means.

3. A flexible, selective programable electrical circuit card as defined in claim 1 wherein said base card has a second surface and including a second electrical component film on said second surface, a plurality of redundant electrically conductive, film paths on said second surface and electrically connected to said second component film, indicia on said circuit card adjacent said redundant paths to facilitate punching through said circuit card and said paths on said second surface to program the use of said second electrical component, and terminal means adjacent said one edge of said circuit card and connected with said second film paths.

4. A flexible, selectively programable electrical circuit card as defined in claim 1 including contact means extending through said base card for connecting said electrical component on said one surface and second electrical component.

5. A flexible, selectively programable electric card as defined in claim 2 wherein said electrical component film is an electrical resistant film, and wherein there are at least four redundant electrically conductive film paths in each group associated with each electrical component film.

6. A circuit card according to claim 2 wherein the indicia indicates the area on the card to punch to selectively sever one or more of the redundant paths, and further includes an indication of the voltage dividing ratio which will occur with respect to the terminal means upon the severing of the redundant paths by such indicia.

7. A flexible, selectively programable electric circuit card as defined in claim 2 wherein said base card has a second surface and includes at least two separate electrical component films on said second surface of said base, at least two separate groups of a plurality of redundant electrically conductive film paths on said second surface of said base, a separate group associated with each component film, and whereby the redundant paths on both surfaces of the base are coincidentally aligned, contact means extending through said base card for connecting the electrical components on both surfaces together so that they electrically are connected to the three terminal means.

* * * * *